US010593535B2

(12) United States Patent
Tateishi

(10) Patent No.: US 10,593,535 B2
(45) Date of Patent: Mar. 17, 2020

(54) MASS SPECTROMETER

(71) Applicant: SHIMADZU CORPORATION, Kyoto-shi, Kyoto (JP)

(72) Inventor: Yusuke Tateishi, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 16/320,627

(22) PCT Filed: Sep. 21, 2016

(86) PCT No.: PCT/JP2016/077898
§ 371 (c)(1),
(2) Date: Jan. 25, 2019

(87) PCT Pub. No.: WO2018/055707
PCT Pub. Date: Mar. 29, 2018

(65) Prior Publication Data

US 2019/0157064 A1 May 23, 2019

(51) Int. Cl.
*H01J 49/42* (2006.01)
*H01J 49/14* (2006.01)
(Continued)

(52) U.S. Cl.
CPC ........ *H01J 49/4215* (2013.01); *G01N 27/622* (2013.01); *H01J 49/06* (2013.01);
(Continued)

(58) Field of Classification Search
USPC .................................................. 250/281, 282
See application file for complete search history.

(56) References Cited

U.S. PATENT DOCUMENTS

2014/0138536 A1* 5/2014 Kou .................... H01J 49/0036 250/282
2018/0286657 A1* 10/2018 Welkie ................ H01J 49/0422

FOREIGN PATENT DOCUMENTS

JP 2000-100374 A 4/2000

OTHER PUBLICATIONS

Yamada, "Kinetic energy discrimination in collision/reaction cell ICP-MS: Theoretical review of principles and limitations", Spectrochimica Acta. Part B: Atomic Spectroscopy., US, (May 30, 2015), vol. 110, doi:10.1016/j.sab.2015.05.008, ISSN 0584-8547, pp. 31-44, XP055282653, 14 pages total.

(Continued)

*Primary Examiner* — Kiet T Nguyen
(74) *Attorney, Agent, or Firm* — Sughrue Mion, PLLC

(57) ABSTRACT

A mass spectrometer including: an ionization chamber (11) that generates ions from a sample, a collision cell (222) located downstream from the ionization chamber (11), a mass separation unit (2412) located downstream from the collision cell (222), an energy barrier unit (223) located between the collision cell (222) and the mass separation unit (2412), a voltage application unit (30) that applies a voltage to each of the ionization chamber (11), the collision cell (222), and the energy barrier unit (223), and a control unit (42) that controls the voltage application unit (30) such that a potential of the ionization chamber (11) is set to a first potential, a potential of the collision cell (222) is set to a second potential that is lower than the first potential, and a potential of the energy barrier unit (223) is set to a third potential between the first potential and the second potential.

4 Claims, 3 Drawing Sheets

(51) Int. Cl.
*G01N 27/62* (2006.01)
*H01J 49/06* (2006.01)
*H01J 49/10* (2006.01)
(52) U.S. Cl.
CPC ............ *H01J 49/105* (2013.01); *H01J 49/14* (2013.01); *H01J 49/42* (2013.01)

(56) References Cited

OTHER PUBLICATIONS

Anonymous, "ICP-MS Inductively Coupled Plasma Mass Spectrometry, A Primer", Agilent Technologies, USA, (Dec. 1, 2005), URL: <https://www.postnova.com/icpms.html?file=tl_files/postnova/content/products/supplies/downloads/Agilent/Introduction%20to%20ICP-MS.pdf>, (Jul. 31, 2019), XP055610039, 84 pages total.
Extended European Search Report dated Aug. 9, 2019 issue by the European Patent Office in counterpart application No. 16916776.4.
Agilent Technologies, Inc., "Principles of ORS", [online], [searched on Aug. 24, 2016], Internet.
Written Opinion of the International Searching Authority of PCT/JP2016/077898 dated Dec. 20, 2016.
International Search Report of PCT/JP2016/077898 dated Dec. 20, 2016.

* cited by examiner

MASS SPECTROMETER

CROSS REFERENCE TO RELATED APPLICATIONS

This application is a National Stage of International Application No. PCT/JP2016/077898 filed Sep. 21, 2016.

TECHNICAL FIELD

The present invention relates to a mass spectrometer equipped with an ionization chamber that generates ions with an inductively coupled plasma or the like, and particularly relates to a mass spectrometer having the function of blocking interfering ions generated in the ionization chamber using a kinetic energy discrimination method.

BACKGROUND ART

As a device for analyzing elements contained in a sample, an inductively coupled plasma mass spectrometer (ICP-MS) is known (e.g., Patent Literature 1). ICP-MS is advantageous in that a wide variety of elements from lithium to uranium (excluding some elements, such as a rare gas) can be analyzed at the ppt level (parts per trillion=$1/10^{12}$), and has been used, for example, for quantifying various heavy metal elements contained in an environmental sample such as tap water, river water, or soil.

ICP-MS includes an ionization chamber equipped with an ICP ion source, which generates atomic ions from a sample (mainly a liquid sample) in an inductively coupled plasma, and a mass spectrometry unit that analyzes the generated ions. The ICP ion source includes a plasma torch having a sample tube through which a liquid sample nebulized by a nebulizer gas flows, a plasma gas tube surrounding the sample tube, a coolant gas tube further surrounding the plasma gas tube, and a high-frequency induction coil wound around a tip of the coolant gas tube. When a high-frequency current flows through the high-frequency induction coil of the plasma torch while a plasma gas (mainly argon gas) passes through the plasma gas tube, a plasma (plasma of as high as 6,000 to 10,000 K) is generated at the tip of the plasma torch. When a nebulized liquid sample is introduced into the sample gas tube in this state, compounds in the sample are atomized and ionized in the high-temperature plasma, resulting in the generation of atomic ions. The generated atomic ions are introduced into the mass spectrometry unit, separated according to the mass-to-charge ratio, and measured.

In many cases, in an ICP ion source, the sample is ionized with an argon gas plasma. Accordingly, in the ionization chamber, not only atomic ions but also polyatomic ions including argon added to atomic ions (argon adduct ions) are generated. When a mass-to-charge ratio of an argon adduct ions is close to the mass-to-charge ratio of the atomic ions to be analyzed, their mass peaks overlap on the mass spectrum. For example, a mass-to-charge ratio of Fe ions (atomic ions to be analyzed) is 55.934939, while a mass-to-charge ratio of ArO ions (argon adduct ions) is 55.957298, which are very close to each other, and thus their mass peaks overlap. The case of argon adduct ions has been described as an example here, but the same problem occurs also in other polyatomic ions besides the argon adduct ions. Hereinafter, atomic ions to be analyzed will be referred to as "analyte ions", and ions having a mass peak overlapping a mass peak of the analyte ions are referred to as "interfering ions".

Even in the case where the mass-to-charge ratio of analyte ions and that of interfering ions are close to each other as described above, both ions can be separated when the mass spectrometry unit has an enhanced mass resolution. As described above, the mass-to-charge ratio of Fe ions is 55.934939, and the mass-to-charge ratio of ArO is 55.957298. Accordingly, when a mass spectrometry unit having a mass resolution of two digits after the decimal point or higher is used, the mass peaks of these two kinds of ions can be separated. Examples of such mass spectrometry units include a time-of-flight mass spectrometry unit and a double-focusing mass spectrometry unit. These mass spectrometry units are expensive, and there also is a problem of increase in device size.

Accordingly, a method in which interfering ions are removed using a mass spectrometry unit equipped with a collision cell has been used. FIG. 1 shows an example of such a mass spectrometry unit. A mass spectrometry unit 130 includes, sequentially from a plasma torch 120 side, an interface unit 131, a converging lens 132, a collision cell 133, an energy barrier unit 134, a mass separation unit 135, and a detection unit 136.

Analyte ions and interfering ions generated in an ionization chamber both pass through the interface unit 131 and the converging lens 132 and are transported to the collision cell 133. An inert gas, such as helium gas, is introduced into the collision cell 133 from a gas supply source (not shown). The analyte ions and interfering ions that have entered the collision cell 133 both collide with inert gas molecules and lose their kinetic energy. The energy that the ions lose upon collision is represented by the following equation.

$$E = E_{ini}\frac{m_1^2 + m_2^2}{(m_1 + m_2)^2} \quad \text{[Equation 1]}$$

In the equation, E is an energy after a single collision, $E_{ini}$ is an initial energy (before the collision), $m_1$ is the mass of an ion, and $m_2$ is the mass of a collision gas molecule.

As is understood from the above equation, the amount of energy that an ion lose in a single collision varies depending on the mass of the ion. In other words, when an analyte ion and an interfering ion are similar in mass to each other, and also they have the same level of initial energy, the amount of energy that these ions lose in a single collision is almost the same. However, as compared to an analyte ion, which is a monatomic ion, a collision cross-section of an interfering ion, which is a polyatomic ion, is large. Accordingly, the average number of collisions with inert gas molecules during the passage through the collision cell 133 is large in interfering ions, and kinetic energy of interfering ions after passing through the collision cell 133 is smaller than kinetic energy of analyte ions. Therefore, by properly adjusting the height of the energy barrier set downstream from the collision cell 133, it is possible to pass analyte ions with large kinetic energy, while blocking interfering ions with small kinetic energy. The technique of separating analyte ions and interfering ions utilizing the difference in energy loss of ions upon gas collision in this manner is referred to as a kinetic energy discrimination (KED) method (e.g., Non Patent Literature 1).

The KED method described above is effective in blocking interfering ions; however, some of analyte ions are also lost. In particular, atomic ions having a small mass lose a large amount of kinetic energy in a single collision, and also the ion flight direction is more likely to change upon collision.

As a result, the amount of ions exiting from the collision cell and passing through the energy barrier decreases, resulting in a decrease in measurement sensitivity. Then, conventionally, when measuring middle- to large-mass atomic ions, or when atomic ions to be analyzed are generated in a large amount, an analysis in which a gas is introduced into the collision cell to preferentially block interfering ions (with-gas analysis) is performed. Meanwhile, when measuring low-mass atomic ions, or when focus is placed on the measurement sensitivity, an analysis in which no gas is introduced (without-gas analysis) is performed. Particularly in the case where the analyte ions are atomic ions whose mass-to-charge ratio is equal to or lower than that of argon, argon adduct ions do not act as interfering ions to such analyte ions, and thus the high-sensitivity, without-gas analysis is suitable.

CITATION LIST

Patent Literature

Patent Literature 1: JP 2000-100374 A

Non Patent Literature

Non Patent Literature 1: Agilent Technologies, Inc., "Principles of ORS", [online], [searched on Aug. 24, 2016], Internet

SUMMARY OF INVENTION

Technical Problem

In ICP-MS, interfering ions are generated mostly in an ionization chamber; interfering ions are also generated inside the collision cell. For example, molecules adhering to the inner wall or the like of the collision cell or neutral molecules that have entered the collision cell together with analyte ions are ionized upon collision with the analyte ions or argon adduct ions generated in the ionization chamber, forming interfering ions. Therefore, even when the without-gas analysis described above is performed to enhance the measurement sensitivity, adequate measurement sensitivity may not be obtained due to background noise caused by these interfering ions generated in the collision cell.

Though ICP-MS has been described as an example here, similar problems occur also in a triple quadrupole mass spectrometer having mass separation units in front of and behind a collision cell, in the case where an MS analysis is executed using only the downstream-side mass spectrometry unit, for example.

An object to be solved by the present invention is to provide a mass spectrometer capable of reducing the influence of interfering ions generated inside a collision cell.

Solution to Problem

The mass spectrometer according to the present invention accomplished in order to solve the above problems includes:

a) an ionization chamber configured to generate ions from a sample;

b) a collision cell located downstream from the ionization chamber;

c) a mass separation unit located downstream from the collision cell;

d) an energy barrier unit located between the collision cell and the mass separation unit;

e) a voltage application unit configured to apply a voltage to each of the ionization chamber, the collision cell, and the energy barrier unit; and f) a control unit configured to control the voltage application unit such that a potential of the ionization chamber is set to a first potential, a potential of the collision cell is set to a second potential that is lower than the first potential, and a potential of the energy barrier unit is set to a third potential between the first potential and the second potential.

In the case where the potential has the opposite polarity to ions, the greater the absolute value of the potential is, the lower the potential is, and in the case where the potential has the same polarity as ions, the smaller the absolute value is, the lower the potential is.

In the mass spectrometer according to the present invention, the potential of the ionization chamber is set to a first potential that is the highest, the potential of the collision cell is set to a second potential that is the lowest, and the potential of the energy barrier unit is set to a third potential between the first potential and the second potential. Ions generated in the ionization chamber are accelerated by the potential difference between the ionization chamber and the collision cell, and decelerated by the potential difference between the collision cell and the energy barrier unit.

In order to facilitate the understanding, it is assumed here that ions generated in the ion source reach the energy barrier unit without colliding with other ions or molecules in the collision cell or the like. In this case, because the potential of the energy harrier unit (third potential) is lower than the potential of the ionization chamber (first potential), ions venerated in the ion source in the ionization chamber can surely pass through the energy barrier. Meanwhile, ions generated in the collision cell (interfering ions) are decelerated by the potential difference between the collision cell and the energy barrier unit. Therefore, such ions cannot pass though the energy barrier unit unless they have kinetic energy larger than this potential difference. Accordingly, by suitably setting the potential difference, it is possible to block interfering ions generated in the collision cell and to reduce their influence.

The mass spectrometer according to the present invention can be configured to further include g) a gas introduction means configured to introduce a predetermined kind of gas at a prescribed pressure into the collision cell, wherein the control unit further controls the gas introduction means to execute a first analysis in which the gas is introduced into the collision cell and a second analysis in which no gas is introduced into the collision cell.

In the mass spectrometer of the above mode, the first analysis (with-gas analysis), in which the influence of interfering ions generated in the ionization chamber is reduced using a kinetic energy discrimination (KED) method, and the second analysis (without-gas analysis), which is a high-sensitivity analysis without using the KED method and in which the influence of interfering ions generated in the collision cell is reduced, can be both performed. Since the KED method is a technique effective in separating atomic ions from molecular ions, the mass spectrometer of the above mode can be suitably used as an inductively coupled plasma mass spectrometer, in which atomic ions are to be analyzed.

Advantageous Effects of Invention

Use of the mass spectrometer according to the present invention makes it possible to reduce the influence of interfering ions generated inside the collision cell.

DESCRIPTION OF EMBODIMENTS

Hereinafter, one embodiment of the mass spectrometer according to the present invention will be described with reference to the drawings. The mass spectrometer of this embodiment is an inductively coupled plasma mass spectrometer (ICP-MS).

Figure 1:
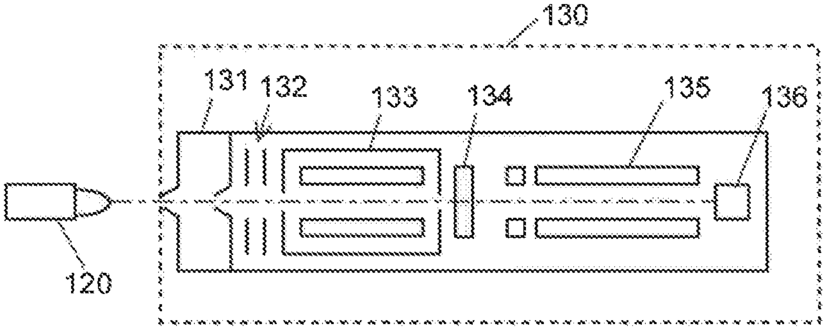
FIG. 1 is a principle configuration diagram of a conventional inductively coupled plasma mass spectrometer.
Figure 2:
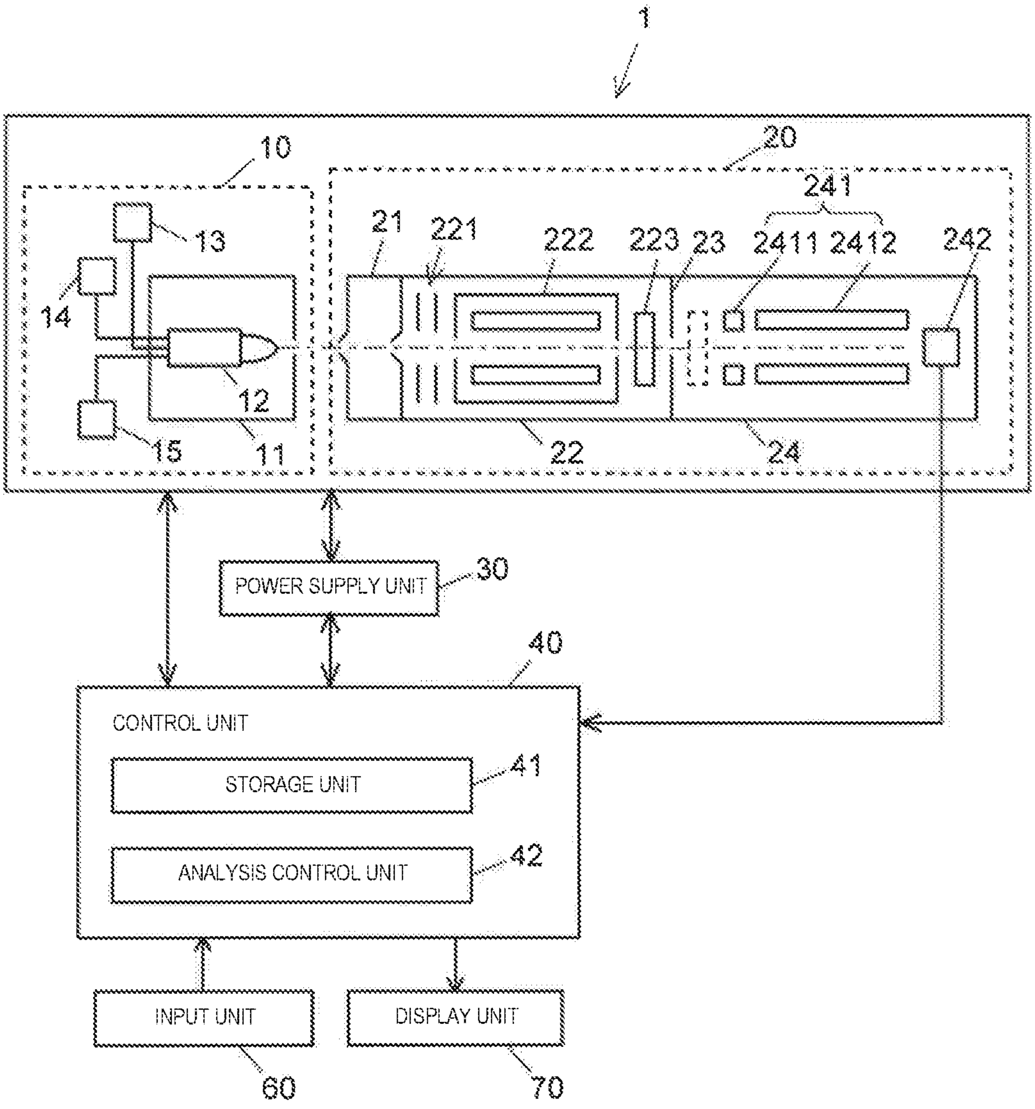
FIG. 2 is a principle configuration diagram of an inductively coupled plasma mass spectrometer as one embodiment of a mass spectrometer according to the present invention.

FIG. 2 is a principle configuration diagram of an inductively coupled plasma mass spectrometer 1 of this embodiment. The inductively coupled plasma mass spectrometer 1 is roughly composed of an ionization unit 10, a mass spectrometry unit 20, a power supply unit 30, and a control unit 40.

The ionization unit 10 has an ionization chamber 11 that is at approximately atmospheric pressure and grounded, and a plasma torch 12 is disposed inside the ionization chamber 11. The plasma torch 12 is composed of a sample tube through which a liquid sample atomized by a nebulizer gas flows, a plasma gas tube formed on an outer periphery of the sample tube, and a coolant gas tube formed on an outer periphery of the plasma gas tube. In addition, the plasma torch 12 also includes an autosampler 13 for introducing a liquid sample into the sample tube of the plasma torch 12, a nebulizer gas supply source 14 for supplying a nebulizer gas to the sample tube, a plasma gas supply source 15 for supplying a plasma gas (argon gas) to the plasma gas tube, and a coolant gas supply source (not shown) for supplying a coolant gas to the coolant gas tube.

The mass spectrometry unit 20 includes, sequentially from the plasma torch 12 side, a first vacuum chamber 21, a second vacuum chamber 22, and a third vacuum chamber 24. The first vacuum chamber 21 is an interface with the ionization chamber 11. In the second vacuum chamber 22, an ion lens 221 for converging the flight trajectory of ions, a collision cell 222, and an energy barrier formation electrode 223 are disposed. The energy barrier formation electrode 223 is an electrode having an opening for the passage of ions, and is used to form the below-described energy barrier. In the third vacuum chamber 24, a quadrupole mass filter 241 (a pre-rod 2411 and a main rod 2412) and a detector 242 are disposed.

The control unit 40 includes a storage unit 41 and also an analysis control unit 42 as a functional block. The entity of the control unit 40 is a personal computer, and a CPU executes a prescribed program (program for mass spectrometry) to realize the analysis control unit 42. In addition, an input unit 60, such as a keyboard or a mouse, and a display section 70, such as a liquid crystal display, are connected to the control unit 40. In the storage unit 41, analysis conditions used in the without-gas analysis and with-gas analysis described below are previously stored. In addition, output signals from the detector 242 are successively stored.

In the inductively coupled plasma mass spectrometer 1 of this embodiment, based on the instructions from the user through the input unit 60, the analysis control unit 42 executes a first analysis in which mass spectrometry is performed with gas introduction into the collision cell 222 (with-gas analysis) and a second analysis in which mass spectrometry is performed without gas introduction into the collision cell 222 (without-gas analysis). The first analysis is an analysis in which the influence of interfering ions generated in the ionization chamber 11 is reduced using the kinetic energy discrimination (KED) method. Meanwhile, the second analysis is an analysis that does not use the KED method. Hereinafter, the case where the second analysis (without-gas analysis) is performed will be described as an example.

When instructed by the user to perform a without-gas analysis through the input unit 60, the analysis control unit 42 applies predetermined voltages to the collision cell 222 and the energy barrier formation electrode 223, respectively. These voltages are predetermined such that the collision cell 222 is at a lower potential than the energy barrier formation electrode 223. For example, in the case where positive ions are measured, voltages are applied such that a negative potential (second potential: −B) is formed in the collision cell 222, and a negative potential whose absolute value is lower than that of the second potential (third potential: −C) is formed in the energy barrier formation electrode 223. In this embodiment, the ionization chamber 11 is grounded. A voltage may also be applied to the ionization chamber 11 to form a first potential (A). As a result, a first potential (A: in this embodiment, ground potential 0) is formed in the ionization chamber 11, a second potential (−B) is formed in the collision cell 222, and a third potential (−C) is formed in the energy barrier formation electrode 223.

Figures 3A, 3B:
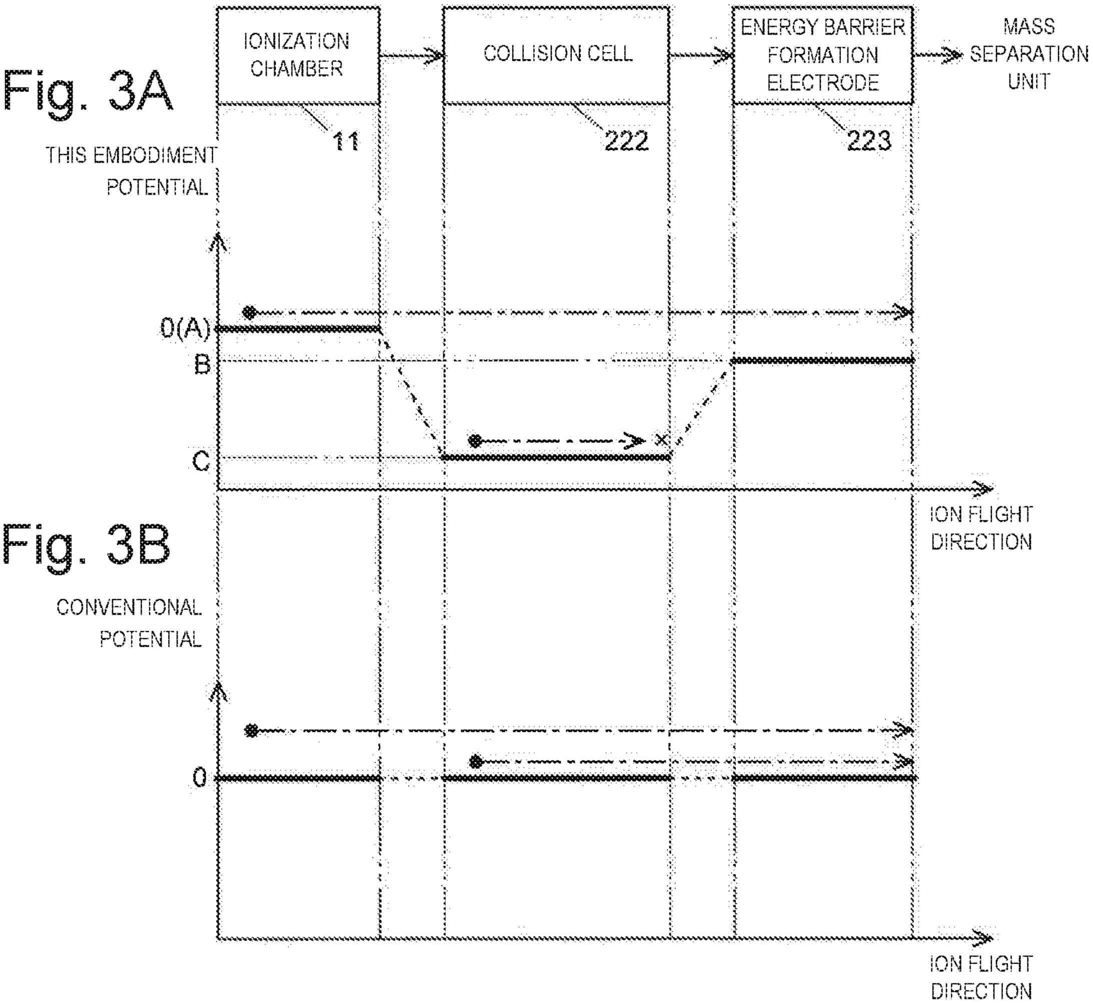
FIGS. 3A and 3B are diagrams illustrating a potential of each unit of the inductively coupled plasma mass spectrometer of this embodiment.

FIG. 3A schematically shows the potentials formed in the ionization chamber 11, the collision cell 222, and the energy barrier formation electrode 223 in the inductively coupled plasma mass spectrometer of this embodiment. In addition, for comparison, FIG. 3B shows the potentials of the respective units in a conventional inductively coupled plasma mass spectrometer.

Before describing the behavior of ions in this embodiment, the conventional configuration will be described. In a conventional inductively coupled plasma mass spectrometer, at the time of a without-gas analysis, all the units are set at the same potential (typically, all at the ground potential). In this case, analyte ions generated in the ionization chamber and interfering ions generated in the collision cell are both introduced into the quadrupole mass filter (mass separation unit) 241 without being accelerated or decelerated. At the time of measuring the analyte ions, the interfering ions cause background noise. Therefore, even when the second analysis focusing on the measurement sensitivity (without-gas analysis) is performed, sufficient measurement sensitivity could not be sometimes obtained.

In the inductively coupled plasma mass spectrometer 1 of this embodiment, in order to solve the above problems in a conventional device, the potentials of the ionization chamber 11, the collision cell 222, and the energy barrier formation electrode 223 are set as described above.

To the analyte ions generated in the ionization chamber 11 which is at the ground potential, the initial kinetic energy is given at the time of generation. The analyte ions are, while moving toward the collision cell 222, accelerated with the energy corresponding to the potential difference (B) between the first potential (0) of the ionization chamber 11 and the second potential (−B) of the collision cell 222. Subsequently, while moving toward the energy harrier formation electrode 223, the ions are decelerated with the energy corresponding to the potential difference (C−B) between the second potential (−B) of the collision cell 222 and the third potential (−C) of the energy barrier formation electrode 223. Because the previous accelerating energy is larger than this decelerating energy, the analyte ions pass through the energy bar formation electrode 223 while possessing the kinetic energy.

Also to the interfering ions generated in the collision cell the initial kinetic energy is given at the time of generation. The interfering ions are, after exiting from the collision cell 222, decelerated with the energy corresponding to the potential difference (C−B) between the second potential (−B) of the collision cell 222 and the third potential (−C) of the energy partition wall formation electrode 223. Unlike the analyte ions, the interfering ions generated in the collision cell 222 are decelerated without being previously accelerated. Accordingly, most of the interfering ions are blocked by energy barrier formed between the collision cell 222 and the energy barrier formation electrode 223. That is, when the second potential (−B) and the third potential (−C) are predetermined such that the energy corresponding to the potential difference (C−B) between the second potential (−B) of the collision cell 222 and the third potential (−C) of the energy barrier formation electrode 223 is larger than the initial kinetic energy of interfering ions generated in the collision cell 222, the analyte ions can be exclusively introduced into the quadrupole mass filter 241 located downstream from the energy barrier formation electrode 223.

Figure 4:
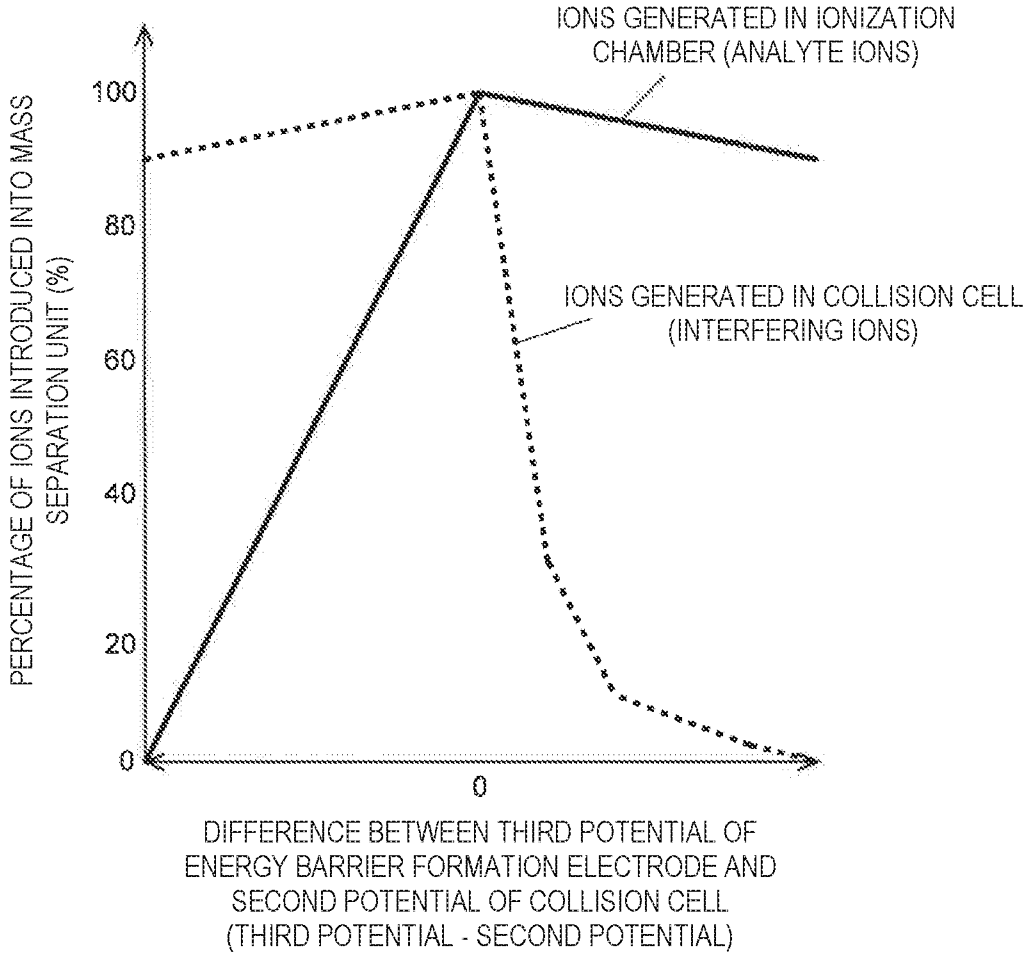
FIG. 4 is a graph showing a relation between a potential difference of a barrier unit with a collision cell and a percentage of ions introduced into a mass separation unit.

FIG. 4 shows the results of the simulation of the relation between the difference between the second voltage applied to the collision cell 222 and the third voltage applied to the energy barrier formation electrode 223 and the percentage of ions introduced into the quadrupole mass filter 241. The horizontal axis of the graph represents the difference between the third voltage of the energy barrier formation electrode 223 and the second voltage of the collision cell 222 (third voltage−second voltage), and the longitudinal axis represents the percentage of ions introduced into the quadrupole mass filter 241 through the energy barrier formation electrode 223 (the percentage relative to the amount of ions introduced into the quadrupole mass filter 241 when the above voltage difference is 0). The solid line in the graph represents analyte ions generated in the ionization chamber 11. While the dashed line represents interfering ions generated in the collision cell 222. The horizontal axis 0 in FIG. 4 corresponds to the conventional configuration, and, taking the percentages of analyte ions and interfering ions introduced at this time as 100%, their introduction percentages at other potential differences were determined by simulation. The region on the right-hand side from the horizontal axis 0 in the graph (i.e., the region where the third potential is higher than the second potential) corresponds to the configuration of this embodiment. In this region, with an increase in the potential difference, the percentage of analyte ions introduced into the quadrupole mass filter 241 somewhat decreases, but the percentage of interfering ions introduced into the quadrupole mass filter 241 can be reduced even more; as a result, the S/N ratio can be improved to enhance the measurement sensitivity.

In order to facilitate the understanding of the characteristics of the present invention, the case where the second analysis (without-gas analysis) is performed has been described as an example here. Also in the first analysis (with-gas analysis), the same configuration as above can be taken. Specifically, when the potential of the energy barrier formation electrode 223 is set lower by an amount corresponding to the kinetic energy that analyte ions lose upon collision with gas molecules in the collision cell 222, the same effects as above can be obtained. In this case, the introduction of interfering ions generated in the ionization chamber 11 into the quadrupole mass filter 241 in the KED method can also be prevented.

The above embodiment is an example and can be suitably modified following the gist of the present invention. In the above embodiment, the energy barrier formation electrode 223 is disposed between the collision cell 222 and the partition wall 23. The energy barrier formation electrode 223 may also be disposed between the partition wall 23 and the pre-rod 2411 (position indicated by, the dashed line in FIG. 2). Alternatively, also when the energy barrier formation electrode 223 is not used, and the pre-rod 2411 is set at the third potential to form an energy barrier with the collision cell 222, the same effects as above can be obtained. Further, it is also possible that the outlet-side wall surface of the collision cell 222 is set at the third potential to form a potential difference with the inside of the collision cell 222, or the partition wall 23 is used as an energy barrier formation electrode and set at the third potential, for example. Like this, various configurations are possible. That is, as long as the energy barrier described above can be formed between the inside of the collision cell 222 and the main rod (mass separations unit) 2412, any suitable configuration can be taken.

In addition, in the above embodiment, an inductively coupled plasma mass spectrometer has been described. Also in a different kind of mass spectrometer such as a triple quadrupole mass spectrometer, as long as it is a mass spectrometer including an ionization chamber, a collision cell, and a mass separation unit, the potentials of the ionization chamber, the collision cell, and the energy barrier unit can be set in the same manner as above, and the influence of interfering ions generated in the collision cell can be reduced.

REFERENCE SIGNS LIST

1 . . . Inductively Coupled Plasma Mass Spectrometer
10 . . . Ionization Unit
11 . . . Ionization Chamber
12 . . . Plasma Torch
13 . . . Autosampler
14 . . . Nebulizer Gas Supply Source
15 . . . Plasma Gas Supply Source
20 . . . Mass Spectrometry Unit
21 . . . First Vacuum Chamber
22 . . . Second Vacuum Chamber
221 . . . Ion Lens
222 . . . Collision Cell
223 . . . Energy Barrier Formation Electrode
23 . . . Partition Wall
24 . . . Third Vacuum Chamber
241 . . . Quadrupole Mass Filter
2411 . . . Pre-Rod
2412 . . . Main Rod

242 . . . Detector
30 . . . Power Supply Unit
40 . . . Control Unit
41 . . . Storage Unit
42 . . . Analysis Control Unit
60 . . . Input Unit
70 . . . Display Unit

The invention claimed is:

1. A mass spectrometer comprising:

a) an ionization chamber configured to generate ions from a sample;

b) a collision cell located downstream from the ionization chamber;

c) a mass separation unit located downstream from the collision cell;

d) an energy barrier unit located between the collision cell and the mass separation unit;

e) a voltage application unit configured to apply a voltage to each of the ionization chamber, the collision cell, and the energy barrier unit; and f) a control unit configured to control the voltage application unit such that a potential of the ionization chamber is set to a first potential, a potential of the collision cell is set to a second potential that is lower than the first potential, and a potential of the energy barrier unit is set to a third potential between the first potential and the second potential.

2. The mass spectrometer according to claim 1, comprising:

g) a gas introduction means configured to introduce a predetermined kind of gas at a prescribed pressure into the collision cell, wherein the control unit further controls the gas introduction means to execute a first analysis in which the gas is introduced into the collision cell and a second analysis in which no gas is introduced into the collision cell.

3. The mass spectrometer according to claim 1, wherein the ionization chamber is grounded.

4. The mass spectrometer according to claim 1, wherein the ionization chamber includes an inductively coupled plasma ion source.

* * * * *